(12) United States Patent
Guan (10) Patent No.: US 8,819,290 B2
(45) Date of Patent: Aug. 26, 2014

(54) METHOD AND SYSTEM FOR TRANSMITTING COMPRESSED RIGHTS

(75) Inventor: Jun Guan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 156 days.

(21) Appl. No.: 13/258,716

(22) PCT Filed: Mar. 25, 2010

(86) PCT No.: PCT/CN2010/071291
§ 371 (c)(1),
(2), (4) Date: Apr. 23, 2012

(87) PCT Pub. No.: WO2010/145253
PCT Pub. Date: Dec. 23, 2010

(65) Prior Publication Data
US 2012/0203931 A1 Aug. 9, 2012

(30) Foreign Application Priority Data
Oct. 23, 2009 (CN) .......................... 2009 1 0177979

(51) Int. Cl.
G06F 15/16 (2006.01)
G06F 21/10 (2013.01)
H04W 12/00 (2009.01)

(52) U.S. Cl.
CPC .................................. *H04W 12/00* (2013.01); *G06F 21/10* (2013.01)
USPC ......................................... 709/247; 709/237

(58) Field of Classification Search
USPC ......................................... 709/237, 246, 247
See application file for complete search history.

(56) References Cited

U.S. PATENT DOCUMENTS

| 6,094,485 A * | 7/2000 | Weinstein et al. ............... 380/30 |
| 2002/0013826 A1* | 1/2002 | Hughes et al. ................ 709/219 |

(Continued)

FOREIGN PATENT DOCUMENTS

| CN | 1258915 A | 7/2000 |
| CN | 101086754 A | 12/2007 |

(Continued)

OTHER PUBLICATIONS

International Search Report in international application No. PCT/CN2010/071291, mailed on Jul. 29, 2010.

(Continued)

*Primary Examiner* — Jeong S Park
(74) *Attorney, Agent, or Firm* — Oppedahl Patent Law Firm LLC (57) ABSTRACT

The disclosure discloses a method for transmitting compressed rights. The method includes that: a terminal negotiates a compress algorithm with a server; the terminal requests the server through an "Extensions" field in a rights object request message to transmit the rights in compression format; the server generates a rights object response message according to a standard approach, compresses the rights in the rights object response message according to the negotiated compress algorithm, and generates a compressed rights object response message and sends the compressed rights object response message to the terminal; the terminal receives the compressed rights object response message, decompresses the rights in the received rights object response message according to the negotiated compress algorithm, and generates a decompressed rights object response message. The disclosure also discloses a system for transmitting compressed rights through which the volume of data in the Rights Object Acquisition Protocol (ROAP) communication can be reduced and the reliability of digital rights object transmission and user experience are improved.

10 Claims, 4 Drawing Sheets

(56) References Cited

U.S. PATENT DOCUMENTS

| | | | |
|---|---|---|---|
| 2003/0097592 A1* | 5/2003 | Adusumilli | 713/201 |
| 2003/0225700 A1 | 12/2003 | Lao | |
| 2003/0233169 A1 | 12/2003 | Tadayon et al. | |
| 2003/0233330 A1 | 12/2003 | Raley et al. | |
| 2004/0015426 A1 | 1/2004 | Tadayon | |
| 2004/0019546 A1 | 1/2004 | Ta et al. | |
| 2008/0040618 A1* | 2/2008 | Andersson et al. | 713/193 |
| 2008/0097775 A1* | 4/2008 | Kim | 705/1 |
| 2008/0320599 A1 | 12/2008 | Raley et al. | |
| 2010/0257370 A1* | 10/2010 | Yoon et al. | 713/189 |

FOREIGN PATENT DOCUMENTS

| | | |
|---|---|---|
| CN | 101272485 A | 9/2008 |
| EP | 1005040 A1 | 5/2000 |
| WO | 03079269 A1 | 9/2003 |
| WO | 2009028792 A1 | 3/2009 |

OTHER PUBLICATIONS

English Translation of the Written Opinion of the International Search Authority in international application No. PCT/CN2010/071291, mailed on Jul. 29, 2010.

Qualcomm, Inc., XML vs Binary Rights Objects, Mar. 3, 2007, 16 total pages, see Supplementary European Search Report.

Hollenbeck, Transport Layer Security Protocol Compression Methods, May 1, 2004, 8 total pages, see Supplementary European Search Report.

Kalker, Ro compression using ASN, Apr. 3, 2005, 3 total pages, see Supplementary European Search Report.

LG Electronics Inc., XML Compression Proposal for ROAP, Jun. 14, 2004, 6 total pages, see Supplementary European Search Report.

Supplementary European Search Report in European application No. 10788649.1, mailed on Jan. 21, 2014, 7 total pages.

* cited by examiner

METHOD AND SYSTEM FOR TRANSMITTING COMPRESSED RIGHTS

TECHNICAL FIELD

The disclosure relates to the Digital Rights Management (DRM) technology in mobile communications, specifically to a method and a device for transmitting compressed rights.

BACKGROUND

The DRM technology aims to provide and use the digital rights content in a manageable way, so as to ensure that the intellectual property can be always protected in the whole value chain. The DRM content format (DCF) is usually encrypted and can be acquired by user in many ways, such as through downloading from the Internet, multimedia message, email or sharing from other users. For normally using the digital content, the user needs to purchase the digital Rights Object (RO), and uses the digital content under the rules and restrictions of the digital rights. The digital content cannot be used without the RO, thereby the RO is regarded as the one really valuable in the value chain.

The process of transmitting the digital rights object is realized by the Rights Object Acquisition Protocol (ROAP), which greatly improves the security level of the digital rights object and makes for a better user experience. With the improvement of digital rights object management service, more and more data are included in the digital rights object; even in a single ROAP communication process, multiple digital rights objects may be transmitted simultaneously, which causes large volume of data of ROAP communication and influences the reliability of data transmission and user experience.

SUMMARY

In view of these, the disclosure mainly aims to provide a method and a device for transmitting compressed rights, so as to reduce the volume of data of ROAP communication and improve the reliability of digital rights object transmission and user experience.

For achieving above aim, the following technical solutions are provided.

In one aspect, a method for transmitting compressed rights is provided, which includes the following steps:

a terminal negotiates a compress algorithm of rights with a server;

the terminal requests the server through an "Extensions" field in a rights object request (RORequest) message to transmit the rights in compression format;

the server generates a rights object response (ROResponse) message according to a standard approach, compresses the rights in the ROResponse message according to the negotiated compress algorithm, and generates a compressed ROResponse message, and sends the compressed ROResponse message to the terminal;

the terminal receives the compressed ROResponse message, decompresses the rights in the received ROResponse message according to the negotiated compress algorithm, and generates a decompressed ROResponse message.

The terminal negotiating the compress algorithm of rights with a server includes the following steps:

the terminal sends a device hello request (DeviceHello) message to the server, and informs the server about the self-supported compress algorithms through the "Supported Compress Algorithm" field newly added in the DeviceHello message;

the server selects the compress algorithm agreed by negotiating according to the content of the "Supported Compress Algorithm" field, and informs the terminal of the selected compress algorithm through the "Selected Compress Algorithm" field newly added in the rights server hello response (RIHello) message.

The terminal requesting the server through the "Extensions" field in the RORequest message to transmit the rights in compression format includes the following steps:

the terminal sends the RORequest message to the server, and informs the server through a "Need Compress Rights" field newly added in the "Extensions" field of the RORequest message to transmit the rights in compression format.

The server generating the ROResponse message, compressing the rights in the ROResponse message, and generating the compressed ROResponse message and sends the compressed ROResponse message to the terminal includes the following steps:

the server receives the RORequest message sent by the terminal, and acquires that rights in compression format need to be transmitted according to a "Need Compress Rights" field in the RORequest message;

the server generates the ROResponse message according to the standard approach, compresses the rights in the ROResponse message according to the compress algorithm in the "Selected Compress Algorithm" field to acquire a "Compress Rights" field, and generates a compressed ROResponse message according to the "Compress Rights" field and sends the compressed ROResponse message to the terminal.

The data of the rights in the ROResponse message after compression is in base64 format.

The terminal decompressing and generating the decompressed ROResponse message includes the following steps:

the terminal receives the compressed ROResponse message, decompresses the rights in the received ROResponse message according to the compress algorithm in the "Selected Compress Algorithm" field, and generates the decompressed ROResponse message.

The method further includes that: after the terminal decompresses the rights in the received ROResponse message, data integrity is verified according to a hash value in the decompressed rights.

In another aspect, a system for transmitting compressed rights is provided, which includes a terminal and a server, in which, the terminal is configured to negotiate a compress algorithm of rights with the server, and request the server through an "Extensions" field in an RORequest message to transmit the rights in compression format; the terminal is further configured to receive a compressed ROResponse message from the server, decompress rights in the received ROResponse message according to the negotiated compress algorithm, and generate a decompressed ROResponse message;

the server is configured to negotiate the compress algorithm of rights with the terminal, generate the ROResponse message according to a standard approach after receiving the RORequest message from the terminal, compress the rights in the ROResponse message according to the negotiated compress algorithm, and generate the compressed ROResponse message and sending the compressed ROResponse message to the terminal.

The terminal is further configured to send a DeviceHello message to the server and inform the server about self-supported compress algorithms through a "Supported Compress Algorithm" field newly added in the DeviceHello message;

correspondingly, the server is further configured to select the compress algorithm agreed by negotiating according to the content of the "Supported Compress Algorithm" field, and inform the terminal of the selected compress algorithm through a "Selected Compress Algorithm" field newly added in a RIHello message.

The terminal is further configured to send the RORequest message to the server, and inform the server through a "Need Compress Rights" field newly added in an "Extensions" field of the RORequest message to transmit the rights in compression format.

The server is further configured to receive the RORequest message sent by the terminal, acquire that rights in compression format need to be transmitted according to a "Need Compress Rights" field in the RORrequest message, generate the ROResponse message according to the standard approach, compress the rights in the ROResponse message according to the compress algorithm in the "Selected Compress Algorithm" field to acquire a "Compress Rights" field, and generate the compressed ROResponse message according to the "Compress Rights" field and sending the compressed ROResponse message to the terminal.

The data of the rights in the ROResponse message after compression is in base64 format.

The terminal is further configured to receive the compressed ROResponse message, decompress the rights in the received ROResponse message according to the compress algorithm in the "Selected Compress Algorithm" field, and generate the decompressed ROResponse message.

The terminal is further configured to verify data integrity according to a hash value in the decompressed rights after decompressing the rights in the received ROResponse message.

The method and system provided by the disclosure compress, in the rights object response (ROResponse) message of ROAP, the rights in Extensible Markup Language (XML) format according to a negotiated algorithm, so as to reduce the volume of data in the process of transmitting ROResponse data; after receiving the ROResponse message, the terminal decompresses the compressed data according to the negotiated algorithm to restore the real ROResponse message.

The method and system of the disclosure make good use of the characteristic that the XML format has excellent extensibility to effectively compress the ROResponse data by extending the XML, reducing the volume of data of ROAP communication and improving the reliability of digital rights object transmission and user experience. In addition, the method of the disclosure also makes good use of the characteristic that the ROAP has handshake security protocol to realize the transmission of compressed rights between the terminal and the server seamlessly.

DETAILED DESCRIPTION

The technical solution of the disclosure is described below with reference to the accompanying drawings and embodiments in detail.

For realizing the compressed transmission of the digital rights object, the main idea of the disclosure is that: in the rights object response (ROResponse) message of ROAP, the rights in Extensible Markup Language (XML) format is compressed according to a negotiated algorithm, so as to reduce the volume of data in the process of transmitting ROResponse data; after receiving the ROResponse message, the terminal decompresses the compressed data according to the negotiated algorithm to restore the real ROResponse message.

Figure 1:
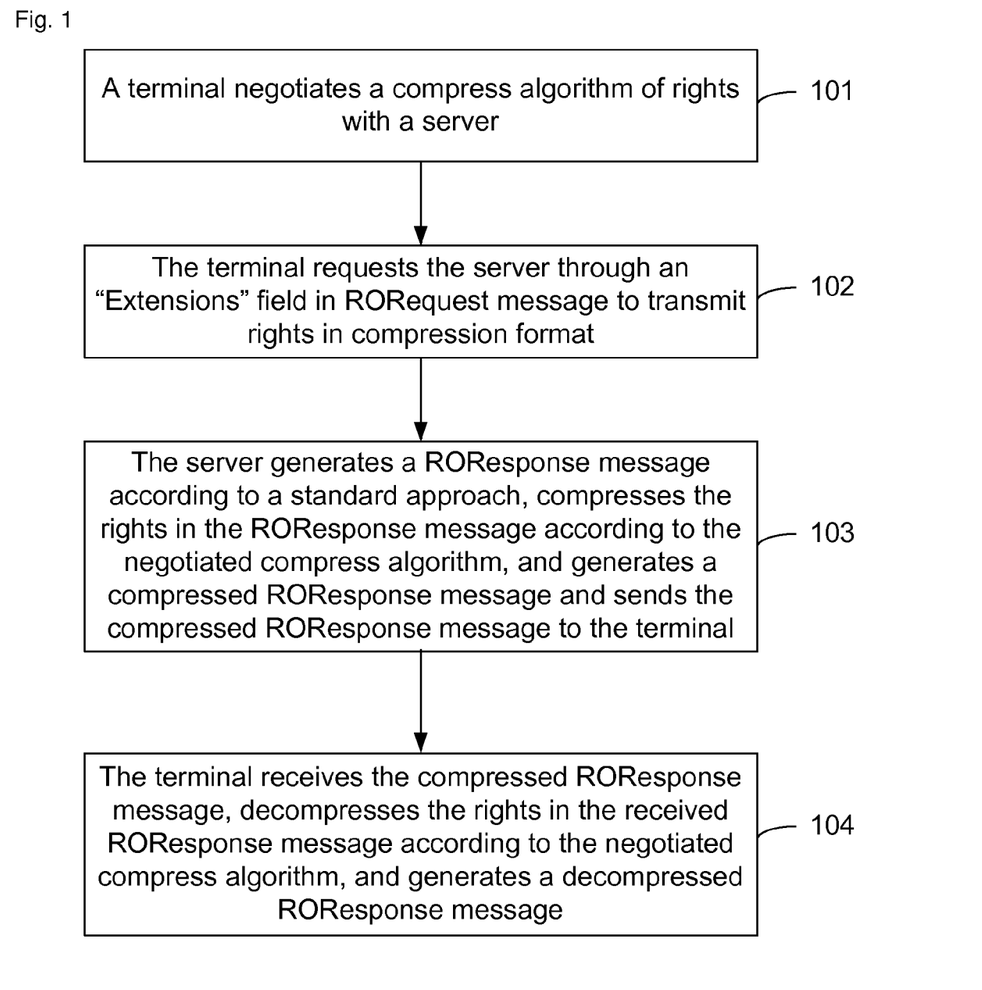
FIG. 1 shows a flowchart of a method for transmitting compressed rights of the disclosure.

On the basis of above main idea, the disclosure provides a method for transmitting compressed rights, as shown in FIG. 1, which mainly comprises the following steps:

Step 101: the terminal negotiates a compress algorithm of rights with the server.

Specifically, in the process of executing ROAP register protocol, the terminal sends a device hello request (DeviceHello) message to the server, and informs the server about self-supported compress algorithms through a "Supported Compress Algorithm" field newly added in the DeviceHello message; the server selects the compress algorithm agreed by negotiating according to the content of the "Supported Compress Algorithm" field, and informs the terminal of the selected compress algorithm through the "Selected Compress Algorithm" field newly added in the rights server hello response (RIHello) message.

Step 102: the terminal requests the server through the "Extensions" field in a rights object request (RORequest) message to transmit the rights in compression format.

Specifically, in the process of executing ROAP rights acquisition protocol, the terminal sends the RORequest message to the server, and informs the server through the "Need Compress Rights" field newly added in the "Extensions" field of the RORequest message to transmit the rights in compression format.

Step 103: the server generates a ROResponse message according to a standard approach, compresses the rights in the ROResponse message according to the negotiated compress algorithm, and generates a compressed ROResponse message and sends the compressed ROResponse message to the terminal.

Specifically, the server receives the RORequest message sent by the terminal, and acquires that the rights in compression format need to be transmitted according to the "Need Compress Rights" field in the RORequest message; the server generates the ROResponse message according to the standard approach, compresses the rights in the ROResponse message according to the compress algorithm in the "Selected Compress Algorithm" field to acquire a "Compress Rights" field, and generates a compressed ROResponse message according to the "Compress Rights" field and sends the compressed ROResponse message to the terminal.

Step 104: the terminal receives the compressed ROResponse message, decompresses the rights in the received ROResponse message according to the negotiated compress algorithm, and generates a decompressed ROResponse message.

Specifically, the terminal receives the compressed ROResponse message, decompresses the rights in the received ROResponse message according to the compress algorithm in the "Selected Compress Algorithm" field, and generates the decompressed ROResponse message.

For adapting to the transmission method shown in FIG. 1, the format of the DeviceHello message in the disclosure is shown in Table 1:

TABLE 1

| Parameter | ROAP-DeviceHello |
| --- | --- |
| Version | M (Mandatory) |
| Device ID | M |
| Supported Algorithms | O (Optional) |
| Supported Compress Algorithms | O |
| Extensions | O |

A "Supported Compress Algorithms" field is added, M denotes mandatory, and O denotes optional; the definition of XML format of the "Supported Compress Algorithms" field is as follows:

```
<element name="SupportedCompressAlgorithm" type="anyURI"
minOccurs="0" maxOccurs="unbounded"/>
```

Correspondingly, in the disclosure, it is needed to modify the definition of XML format of the DeviceHello message, and the modified definition of XML format of the Device-Hello message is as follows:

```
<element name="deviceHello" type="roap: DeviceHello"/>
<complexType name="DeviceHello">
<annotation>
<documentation xml: lang="en">
Message sent from Device to RI to establish an RI Context.
</documentation>
</annotation>
<complexContent>
<extension base="roap: Request">
<sequence>
<element name="version" type="roap: Version"/>
<element name="deviceID" type="roap: Identifier"
maxOccurs="unbounded"/>
<element name="supportedAlgorithm" type="anyURI"
minOccurs="0"
maxOccurs="unbounded"/>
<element name="supportedCompressAlgorithm" type="anyURI"
minOccurs="0"
maxOccurs="unbounded"/>
<element name="extensions" type="roap: Extensions"
minOccurs="0"/>
</sequence>
</extension>
</complexContent>
</complexType>
```

Likewise, for adapting to the transmission method shown in FIG. 1, the format of the RIHello message in the disclosure is shown in Table 2:

TABLE 2

| | ROAP-RIHello | |
| --- | --- | --- |
| Parameter | Status = "Success" | Status≠"Success" |
| Status | M | M |
| Session ID | M | — |
| Selected Version | M | — |
| RI ID | M | — |
| Selected Algorithms | O | — |
| Selected Compress Algorithms | O | — |
| RI Nonce | O | — |
| Trusted Device Authorities | O | — |
| Server Info | O | — |
| Extensions | O | — |

A "Selected Compress Algorithms" field is added, and the definition of XML format thereof is as follows:

```
<element name="selectedCompressAlgorithm" type="anyURI"
minOccurs="0" maxOccurs="unbounded"/>
```

Correspondingly, in the disclosure, it is needed to modify the definition of XML format of the RIHello message, and the modified definition of XML format thereof is as follows:

```
<element name="riHello" type="roap: RIHello"/>
<complexType name="RIHello">
<annotation>
<documentation xml: lang="en">
Message sent from RI to Device in response to a deviceHello
message.
</documentation>
</annotation>
<complexContent>
<extension base="roap: Response">
<sequence minOccurs="0">
<element name="selectedVersion" type="roap: Version"/>
<element name="riID" type="roap: Identifier"/>
<element name="selectedAlgorithm" type="anyURI"
maxOccurs="unbounded"
minOccurs="0"/>
<element name="selectedCompressAlgorithm" type="anyURI"
minOccurs="0"
maxOccurs="unbounded"/>
<element name="riNonce" type="roap: Nonce"/>
<element name="trustedAuthorities" type="roap: KeyIdentifiers"
minOccurs="0"/>
<element name="serverInfo" type="base64Binary"
minOccurs="0"/>
<element name="extensions" type="roap: Extensions"
minOccurs="0"/>
</sequence>
<attribute name="sessionId" type="string"/>
</extension>
</complexContent>
```

In addition, in the format of RORequest message, it is needed to add the "Need Compress Rights" field in the "Extensions" field, and the definition of XML format thereof is as follows:

```
<complexType name="NeedCompressRights">
<complexContent>
<extension base="roap: Extension"/>
</complexContent>
</complexType>
``` that is, if there is "Need Compress Rights" field in the RORequest message, it means that the terminal requests the server to return a compressed ROResponse message; or else, it means that the terminal does not request the server to return a compressed ROResponse message.

It is needed to add the "Compress Rights" field in the format of ROResponse message, and the definition of XML format thereof is as follows:

```
<complexType name="CompressRights">
<sequence>
<element name="compressData" type="base64Binary"/>
<element name="hash" type="base64Binary"/>
<sequence>
<attribute name="id" type="o-ex: id" />
<attribute name="compressAlgorithm" type="anyURI"/>
</complexType>
```

The "compressData" field is the rights data compressed according to the compress algorithm, and the data is in base64 format; the "hash" field is a digest value, which is obtained by computing through the secure hash algorithm-1 (SHA-1), of original rights data; the "id" attribute of the "Compress Rights" field has to be identical to that of the "rights" field; the "compressAlgorithm" attribute means the compress algorithm adopted by the compressed rights.

Thereby, the format of the modified "ROPayload" field in the ROResponse message is as follows:

```
<!-- Rights Object Definitions -->
<complexType name="ROPayload">
<sequence>
<element name="riID" type="roap: Identifier"/>
<element name="rights" type="o-ex: rightsType"
   minOccurs="0"/ >
<element name="compressRights" type="roap: CompressRights"
   minOccurs="0"/>
<element name="signature" type="ds: SignatureType"
   minOccurs="0"/>
<element name="timestamp" type="dateTime"
   minOccurs="0"/>
<element name="encKey" type="xenc: EncryptedKeyType"/>
</sequence>
<attribute name="version" type="roap: Version"
   use="required"/>
<attribute name="id" type="ID" use="required"/>
<attribute name="stateful" type="boolean"/>
<attribute name="domainRO" type="boolean"/>
<attribute name="rightsCompressed" type="boolean"/>
<attribute name="riURL" type="anyURI"/>
</complexType>
```

In which, the "rights" field is a selectable field; if a compression manner is adopted, the "rights" field can be omitted; the "compress Rights" field is indispensable when a compression manner is adopted, and is dispensable when no compression manner is adopted; the "rights Compressed" attribute is used for indicating whether the rights included in the "ROPayload" field has been compressed.

The transmission method shown in FIG. 1 is further described below with reference to embodiments in detail.

Figure 2:
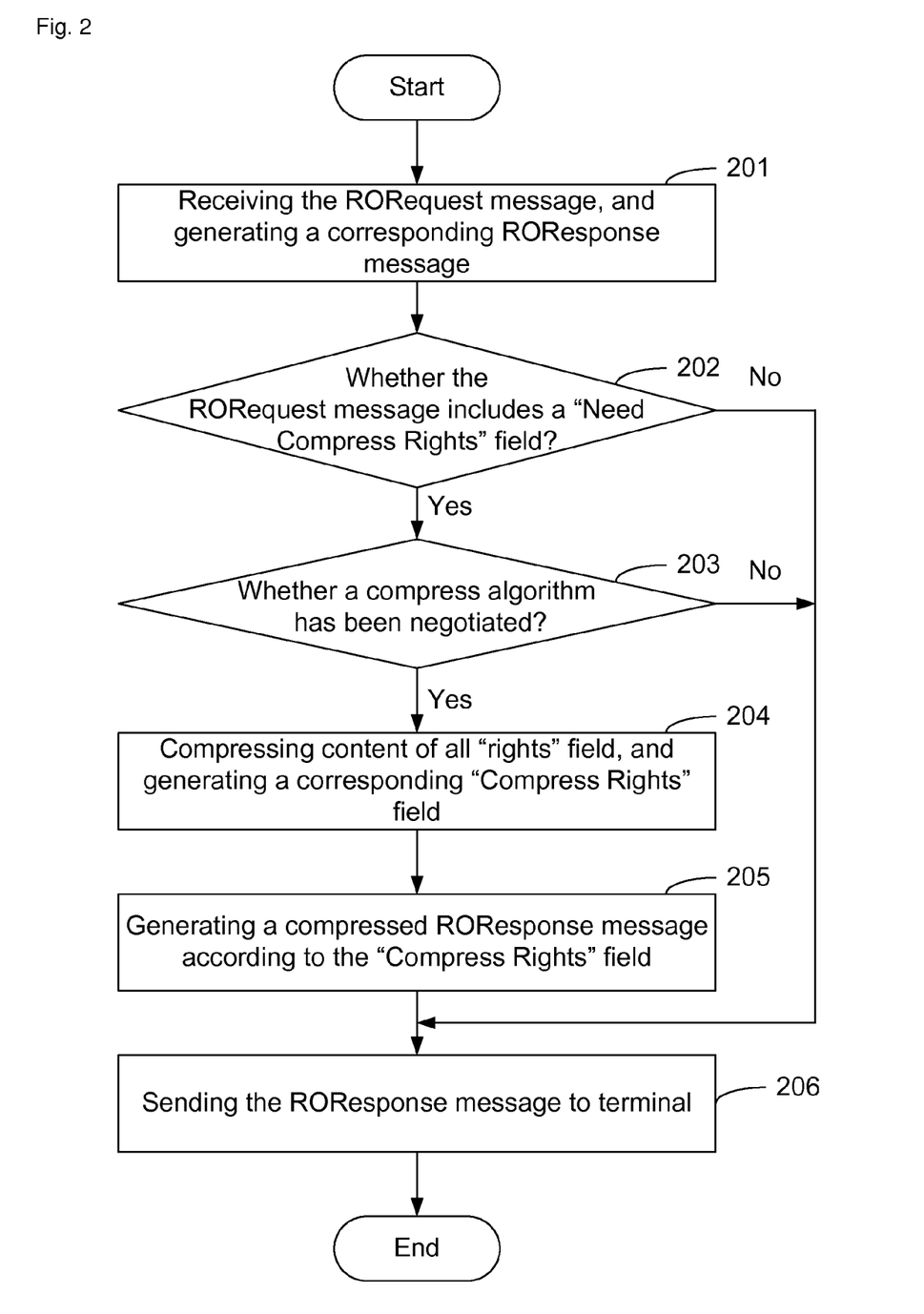
FIG. 2 shows a flowchart of realizing the transmission method of the disclosure at a server.

The embodiment 1 of the disclosure mainly describes the flow of realizing the transmission method at the server, as shown in FIG. 2, which mainly includes the following steps:

Step 201: the server receives a RORequest message from the terminal, and generates a corresponding ROResponse message.

Step 202: the server determines whether the RORequest message includes a "Need Compress Rights" field, if includes, executing Step 203, if not, executing Step 206.

If the RORequest message includes the "Need Compress Rights" field, it means that the terminal requests the server to return a compressed ROResponse message; otherwise, it means that the terminal does not request the server to return a compressed ROResponse message.

Step 203: the server determines whether a compress algorithm has been negotiated with the terminal, if so, executing Step 204; or else, executing Step 206.

The server determines whether a compress algorithm has been negotiated with the terminal, according to the content of a "Selected Compress Algorithms" field in the RIHello message.

Step 204: the content of all the "rights" field in the ROResponse message is compressed according to the negotiated compress algorithm and a corresponding "Compress Rights" field is generated.

Step 205: a compressed ROResponse message is generated according to the "Compress Rights" field; then, executing Step 206.

Step 206: the server sends the generated ROResponse message to the terminal.

Note that, if Step 206 is executed after Step 202 or Step 203, an uncompressed ROResponse message is sent by the server; if Step 206 is executed after Step 205, the a compressed ROResponse message is sent by the server.

Figure 3:
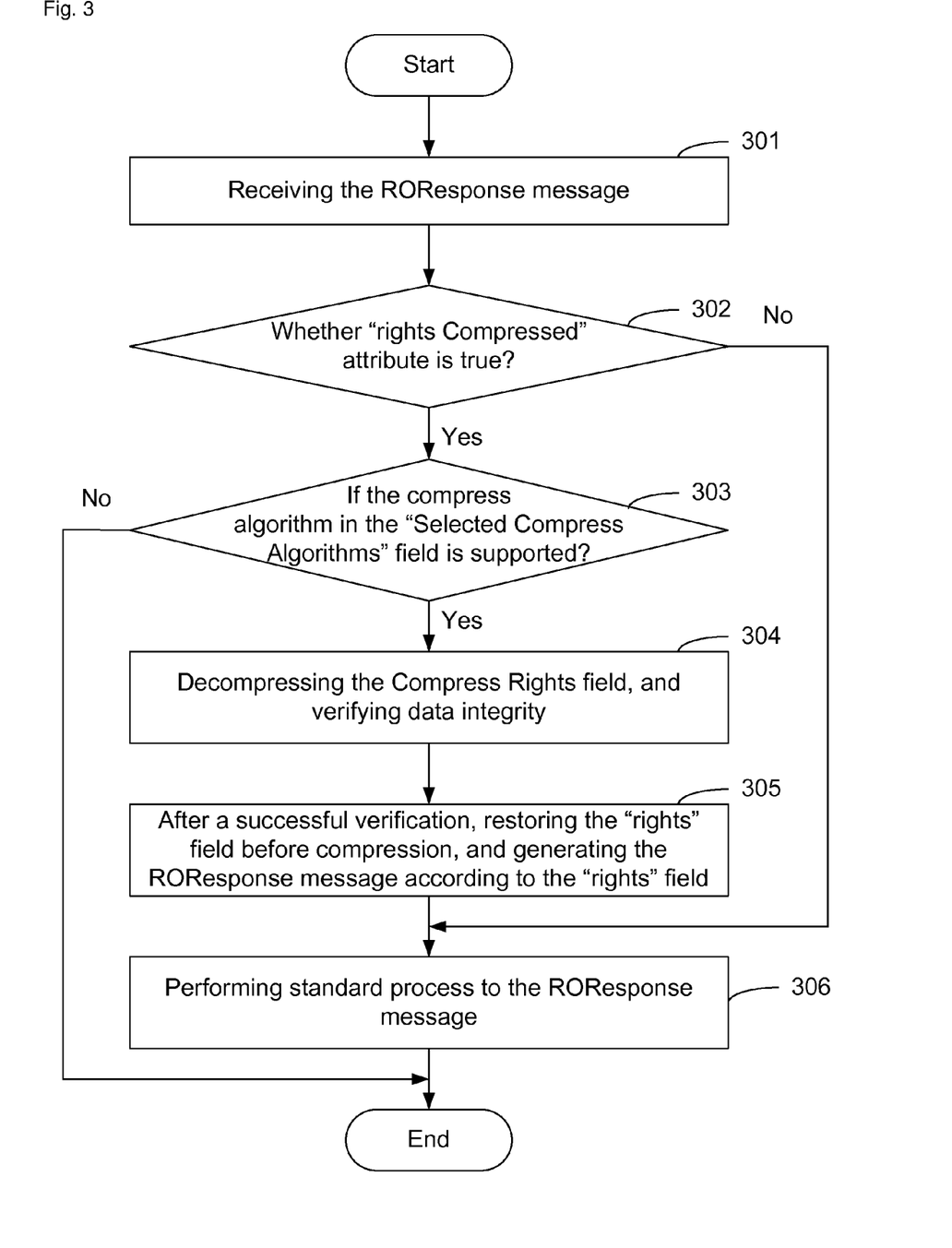
FIG. 3 shows a flowchart of realizing the transmission method of the disclosure at a terminal.

The embodiment 2 of the disclosure mainly describes the flow of realizing the transmission method at the terminal, as shown in FIG. 3, which mainly includes the following steps:

Steps 301-302: the terminal receives the ROResponse message from the server, determines whether the "rights Compressed" attribute in the "ROPayload" field of the ROResponse message is true, if so, executing Step 303; or else, executing Step 306.

Step 303: the terminal determines whether the compress algorithm presented in the "Selected Compress Algorithms" field is supported by itself, if so, executing Step 304; or else, the terminal fails to process the ROResponse message, the whole flow is ended.

Step 304: the terminal decompresses the "Compress Rights" field in the ROResponse message according to the compress algorithm presented in the "Selected Compress Algorithms" field, and verifies data integrity according to the hash value in the decompressed "Compress Rights" field.

Step 305: after a successful verification, the "rights" field before compression is restored and the ROResponse message is generated according to the "rights" field.

Step 306: performing standard process to the ROResponse message.

Figure 4:
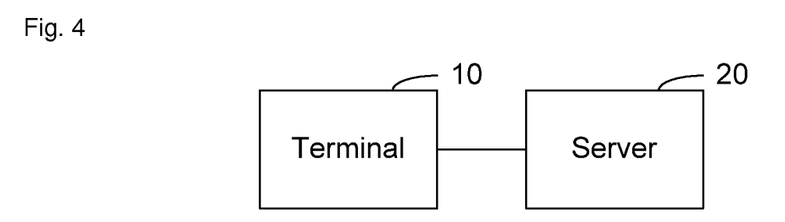
FIG. 4 shows a structural diagram of a system for transmitting compressed rights of the disclosure.

For realizing the method for transmitting compressed rights, the method further provides a system for transmitting compressed rights; as shown in FIG. 4, the system includes a terminal 10 and a server 20. Specifically, the terminal 10 negotiates a compress algorithm of rights with the server 20, and requests the server 20 through an "Extensions" field in the RORequest message to transmit the rights in compression format. The terminal 10 further receives a compressed ROResponse message from the server 20, decompresses the rights in the received ROResponse message according to the negotiated compress algorithm, and generates the decompressed ROResponse message. The server 20 negotiates the compress algorithm of rights with the terminal 10, generates the ROResponse message according to the standard approach after receiving the RORequest message from the terminal 10, compresses the rights in the ROResponse message according to the negotiated compress algorithm, and generates a compressed ROResponse message and sends the compressed ROResponse message to the terminal 10.

Preferably, the terminal 10 further sends the DeviceHello message to the server 20, and informs the server 20 about self-supported compress algorithms through a "Supported Compress Algorithm" field newly added in the DeviceHello message; correspondingly, the server 20 further selects the compress algorithm agreed by negotiating according to the content of the "Supported Compress Algorithm" field, and informs the terminal 10 of the selected compress algorithm through the "Selected Compress Algorithm" field newly added in the RIHello message.

The terminal 10 further sends the RORequest message to the server 20, and informs the server 20 through the "Need Compress Rights" field newly added in the "Extensions" field of the RORequest message to transmit the rights in compression format.

The server 20 further receives the RORequest message sent by the terminal 10, acquires that the rights in compression format need to be transmitted according to the "Need Compress Rights" field in the RORrequest message, generates the ROResponse message according to the standard approach, compresses the rights in the ROResponse message according to the compress algorithm in the "Selected Compress Algorithm" field to acquire the "Compress Rights" field, and generates a compressed ROResponse message according to the "Compress Rights" field and sending the compressed ROResponse message to the terminal 10.

The terminal 10 further receives the compressed ROResponse message, decompresses the rights in the received ROResponse message according to the compress algorithm in the "Selected Compress Algorithm" field, and generates the decompressed ROResponse message.

As described above, the method and system of the disclosure make good use of the characteristic that the XML format has excellent extensibility to effectively compress the ROResponse data by extending the XML, thereby reducing the volume of data of ROAP communication and improving the reliability of digital rights object transmission and user experience; in addition, the method of the disclosure also makes good use of the characteristic that the ROAP has handshake security protocol to realize the transmission of compressed rights between the terminal and the server seamlessly.

The above is only the preferred embodiment of the disclosure and not intended to limit the scope of protection of the disclosure.

The invention claimed is:

1. A method for transmitting compressed rights, comprising:
    negotiating, by a terminal, a compress algorithm of rights with a server;
    requesting, by the terminal, the server through an "Extensions" field in a rights object request (RORequest) message to transmit the rights in compression format;
    generating, by the server, a rights object response (ROResponse) message according to a standard approach, compressing the rights in the ROResponse message according to the negotiated compress algorithm, generating a compressed ROResponse message, and sending the compressed ROResponse message to the terminal; and
    receiving, by the terminal, the compressed ROResponse message, decompressing the rights in the received ROResponse message according to the negotiated compress algorithm, and generating a decompressed ROResponse message;
    wherein negotiating, by the terminal, the compress algorithm of rights with the server comprises:
    sending, by the terminal, a device hello request (DeviceHello) message to the server, and informing the server about self-supported compress algorithms through a "Supported Compress Algorithm" field newly added in the DeviceHello message; and
    selecting, by the server, the compress algorithm agreed by negotiating according to content of the "Supported Compress Algorithm" field, and informing the terminal of the selected compress algorithm through a "Selected Compress Algorithm" field newly added in a rights server hello response (RIHello) message;
    wherein requesting, by the terminal, the server through the "Extensions" field in the RORequest message to transmit the rights in compression format comprises:
    sending, by the terminal, the RORequest message to the server, and informing the server through a "Need Compress Rights" field newly added in the "Extensions" field of the RORequest message to transmit the rights in compression format.

2. The method according to claim 1, wherein generating, by the server, the ROResponse message, compressing the rights in the ROResponse message, and generating a compressed ROResponse message and sending the compressed ROResponse message to the terminal comprises:
    receiving, by the server, the RORequest message sent by the terminal, and acquiring that rights in compression format need to be transmitted according to a "Need Compress Rights" field in the RORequest message; and
    generating, by the server, the ROResponse message according to the standard approach, compressing the rights in the ROResponse message according to the compress algorithm in the "Selected Compress Algorithm" field to acquire a "Compress Rights" field, and generating a compressed ROResponse message according to the "Compress Rights" field and sending the compressed ROResponse message to the terminal.

3. The method according to claim 2, wherein data of the rights in the ROResponse message after compression is in base 64 format.

4. The method according to claim 2, wherein decompressing and generating the decompressed ROResponse message by the terminal comprises:
    receiving, by the terminal, the compressed ROResponse message, decompressing the rights in the received ROResponse message according to the compress algorithm in the "Selected Compress Algorithm" field, and generating the decompressed ROResponse message.

5. The method according to claim 4, further comprising: verifying data integrity according to a hash value in the decompressed rights after the terminal decompresses the rights in the received ROResponse message.

6. A system for transmitting compressed rights, comprising: a terminal and a server; wherein,
    the terminal is configured to negotiate a compress algorithm of rights with the server, and request the server through an "Extensions" field in an RORequest message to transmit the rights in compression format; the terminal is further configured to receive a compressed ROResponse message from the server, decompress rights in the received ROResponse message according to the negotiated compress algorithm, and generate a decompressed ROResponse message; and
    the server is configured to negotiate the compress algorithm of rights with the terminal, generate the ROResponse message according to a standard approach after receiving the RORequest message from the terminal, compress the rights in the ROResponse message according to the negotiated compress algorithm, generate the compressed ROResponse message and send the compressed ROResponse message to the terminal;
    wherein the terminal is further configured to send a DeviceHello message to the server and inform the server about self-supported compress algorithms through a "Supported Compress Algorithm" field newly added in the DeviceHello message; and
    correspondingly, the server is further configured to select the compress algorithm agreed by negotiating according to the content of the "Supported Compress Algorithm" field, and inform the terminal of the selected compress algorithm through a "Selected Compress Algorithm" field newly added in a RIHello message;
    wherein the terminal is further configured to send the RORequest message to the server, and inform the server through a "Need Compress Rights" field newly added in the "Extensions" field of the RORequest message to transmit the rights in compression format.

7. The system according to claim 6, wherein the server is further configured to receive the RORequest message sent by the terminal, acquire that rights in compression format need to be transmitted according to a "Need Compress Rights" field in the RORrequest message, generate the ROResponse message according to the standard approach, compress the rights in the ROResponse message according to the compress algorithm in the "Selected Compress Algorithm" field to acquire a "Compress Rights" field, and generate the compressed ROResponse message according to the "Compress Rights" field and sending the compressed ROResponse message to the terminal.

8. The system according to claim 7, wherein data of the rights in the ROResponse message after compression is in base 64 format.

9. The system according to claim 7, wherein the terminal is further configured to receive the compressed ROResponse message, decompress the rights in the received ROResponse message according to the compress algorithm in the "Selected Compress Algorithm" field, and generate the decompressed ROResponse message.

10. The system according to claim 9, wherein the terminal is further configured to verify data integrity according to a hash value in the decompressed rights after decompressing the rights in the received ROResponse message.

* * * * *